United States Patent
Sangren et al.

[11] Patent Number: 5,913,521
[45] Date of Patent: Jun. 22, 1999

[54] ROTATING SEAL RING COMPONENT KIT FOR A MECHANICAL SPLIT SEAL

[75] Inventors: Jan E. Sangren, Providence; James S. Porter, Warren, both of R.I.

[73] Assignee: John Crane Sealol Inc., Cranston, R.I.

[21] Appl. No.: 08/921,038

[22] Filed: Aug. 29, 1997

[51] Int. Cl.$^6$ .............................. F16J 15/34; F16J 15/16
[52] U.S. Cl. ..................... 277/372; 277/373; 277/370; 277/371; 277/545
[58] Field of Search .................................. 277/306, 372, 277/373, 358, 370, 545, 371

[56] References Cited

U.S. PATENT DOCUMENTS

| | | |
|---|---|---|
| 2,294,105 | 8/1942 | Wallgren . |
| 2,996,319 | 8/1961 | Copes . |
| 3,025,070 | 3/1962 | Copes . |
| 3,101,200 | 8/1963 | Tracy . |
| 3,244,425 | 4/1966 | Wilkinson . |
| 4,215,870 | 8/1980 | Escue . |
| 4,410,188 | 10/1983 | Copes . |
| 4,576,384 | 3/1986 | Azibert . |
| 5,020,809 | 6/1991 | Mullaney . |
| 5,370,401 | 12/1994 | Sandgren . |

FOREIGN PATENT DOCUMENTS 917693   2/1963   United Kingdom .
1142327  2/1969   United Kingdom .

OTHER PUBLICATIONS

Bugmann Mechanical Seals Design Manual 10, cover page and Single Seal M 43 S and Double Seal HS–D & Rohrgehäusepumpe mit,, Geteilter Dichtung in Meerwasser–entsalzungsanlage.

Bezak, Robert, "Design and Application of Split Mechanical End Face Seals," Jun., 1978 Lubrication Engineering, vol. 34.

Primary Examiner—Anthony Knight
Assistant Examiner—Gary Grafel
Attorney, Agent, or Firm—Dorn, McEachran, Jambor & Keating

[57] ABSTRACT

A rotating seal ring component kit is provided which comprises a seal ring having a split dividing the seal ring into at least two sections configured to fit around a shaft, a clamp ring having a split dividing the clamp ring into at least two sections configured to circumferentially surround the seal ring, each clamp ring section having tabs which cooperate with corresponding tabs on another clamp ring section to permit assembly of the clamp ring sections around the seal ring; and a housing having a split dividing the housing into at least two sections configured to fit around the shaft, the housing including first and second notches configured to receive the tabs so as to prevent rotation of the clamp ring relative to the housing. A snap ring may be utilized to provide preliminary assembly of the clamp ring sections.

20 Claims, 6 Drawing Sheets

SUPPORT
BENDING MOMENT

ROTATING SEAL RING COMPONENT KIT FOR A MECHANICAL SPLIT SEAL

BACKGROUND OF THE INVENTION

I. Field of the Invention

The present invention relates to mechanical split seals for sealing along a shaft and, more specifically, to a rotating seal ring component kit including the parts for a rotating seal ring component of a mechanical split seal and including the method of assembling those parts into a rotating seal ring component.

II. Background Information

Equipment such as pumps operate in an environment in which a rotating shaft must be sealed around its periphery to prevent fluids from entering into or exiting from a housing adjacent the shaft. In certain installations sealing elements in such equipment are relatively inaccessible. To avoid the effort and time required to completely disassemble such equipment, split seal rings may be used as the sealing elements which comprise a plurality of split elements surrounding a shaft rather than non-split elements. Replacement of the sealing elements may thus be accomplished without having to slide a solid seal ring off the shaft or disassemble other non-split to permit removal of a solid seal ring. The split seal rings are simply disassembled and removed from around the shaft.

Normally, two opposing split seal rings are provided. One is stationary (i.e., non-rotating) and the other rotates. Typically, each split seal ring comprises two halves extending 180 degrees to constitute a complete seal ring. However, it is possible to split a ring into three or more pieces. Accordingly, the terms "halves" or "sections" in this application as applied to seal rings or any other element of a mechanical split seal, are intended to reference at least two pieces and may, therefore, include three or more pieces.

U.S. Pat. No. 5,370,401 issued to Sandgren (the "Sandgren patent") discloses a mechanical split seal comprising a pair of seal ring halves which are configured to fit around a shaft and rotate, and a pair of seal ring halves which are stationary. The assembly of parts which mounts the rotating seal ring halves to the shaft may be referred to as a rotating seal ring component of a mechanical split seal and the parts which make up the rotating seal ring component of a mechanical split seal may be referred to as a rotating seal ring component kit. A rotating seal ring component kit may be distributed independently to replace a rotating seal ring component or may be distributed as part of a mechanical split seal kit which includes parts not only for the rotating seal ring component but also for the remaining components of a mechanical split seal.

The rotating seal ring component disclosed in the Sandgren patent comprises a split seal ring made up of a pair of seal ring halves configured to fit around a shaft, and a split housing made up of a pair of housing halves configured to circumferentially surround the seal ring halves. An o-ring is interposed between the seal ring halves and the housing halves to support the seal ring in the housing.

Rotating seal ring components of this type do not employ any rigid clamping of the seal ring halves but rather rely upon pressure exerted through the o-ring and/or from fluid external to the seal ring halves to hold the seal ring halves together. Other examples of this type of rotating seal ring component may be seen in U.S. Pat. No. 4,576,384 issued to Azibert and U.S. Pat. No. 3,244,425 issued to Wilkinson.

The non-rigidly clamped seal ring configurations represented by the Sandgren, Azibert, and Wilkinson patents are distinguished from prior art mechanical split seal arrangements in which there is rigid mechanical clamping employed to hold seal ring halves together. One example of a rigid mechanical clamping arrangement is illustrated in U.S. Pat. No. 3,101,200 issued to Tracy.

An object of the present invention is to provide a rotating seal ring component and related kit and method of assembly in which the seal ring halves are mechanically clamped together around a shaft by rigid, hard surface to hard surface contact.

Additional objects and advantages of the invention will be set forth in part in the description which follows and in part will be obvious from the description or may be learned by practice of the invention.

SUMMARY OF THE INVENTION

To achieve the foregoing objects, and in accordance with the purposes of the invention as embodied and broadly described herein, a rotating seal ring component kit is provided which comprises a seal ring having a split dividing the seal ring into at least two sections configured to fit around a shaft; a clamp ring having a split dividing the clamp ring into at least two sections configured to circumferentially surround the seal ring, the clamp ring sections each having tabs which cooperate with corresponding tabs on another clamp ring section to permit assembly of the clamp ring sections around the seal ring; and a housing having a split dividing said housing into at least two sections configured to fit around the shaft, the housing including first and second notches configured to receive the tabs so as to prevent rotation of the clamp ring relative to the housing.

The notches of the housing preferably have an interior configuration and the tabs of the clamp ring preferably have an exterior configuration to fixedly hold the clamp ring in the housing upon initial rotation of the clamp ring. Specifically, the axial dimension of the tabs preferably is less than one axial dimension of the notches to permit the tabs to be inserted into the notches but greater than a second axial dimension of the notches to allow the interaction of tabs and notches to fixedly hold the clamp ring in the housing upon initial rotation of the clamp ring.

The seal ring may include an outer circumferential groove having an axial width greater than the axial width of the clamp ring in order to assist in positioning of the clamp ring around the seal ring. The tabs of the clamp ring may also include either captured screws or corresponding threaded holes to receive the screws in order to facilitate assembly of the clamp ring sections around the seal ring.

It is also preferable that the seal ring include at least one mark positioned to permit a preset radial mis-alignment between the seal ring and the clamp ring. Preferably, this preset radial mis-alignment positions the split of the seal ring sections, in a two-section configuration, in the range of 30 degrees to 50 degrees (and preferably approximately 38 degrees) from the tabs. This radial mis-alignment has been found to minimize the adverse effect of any flexing of the seal ring once mechanically secured into position by the clamp ring.

Still further, in order to facilitate assembly of the parts of the rotating seal ring component kit of the subject invention, it is further preferable there be provided a snap ring and that the seal ring includes an outer circumferential recess of sufficient dimension to receive the snap ring to thereby temporarily hold the seal ring sections in position and yet permit assembly of the clamp ring over the snap ring for final mechanical assembly of the clamp ring around the seal ring.

The invention of the subject application is directed not only toward the kit comprising the parts of a rotating seal ring component as set forth above but also toward the resultant rotating seal ring component when the parts of the kit are assembled.

Still further, it is contemplated that the subject invention includes and encompasses a method of mounting a rotating seal ring component on a shaft comprising the steps of positioning sections of a split seal ring around a shaft; assembling sections of a clamp ring around the seal ring to circumferentially surround the seal ring, each clamp ring section having tabs which cooperate with corresponding tabs on another clamp ring section to permit assembly of the clamp ring sections around the seal ring; and assembling sections of a split housing around the shaft, the housing sections including first and second notches, with this step of assembling including positioning the tabs in the notches to restrict relative rotation between the housing and the clamp ring.

DESCRIPTION OF THE PREFERRED EMBODIMENT

Reference will now be made in detail to the present preferred embodiment of the subject invention as illustrated in the accompanying drawings.

Figure 1:
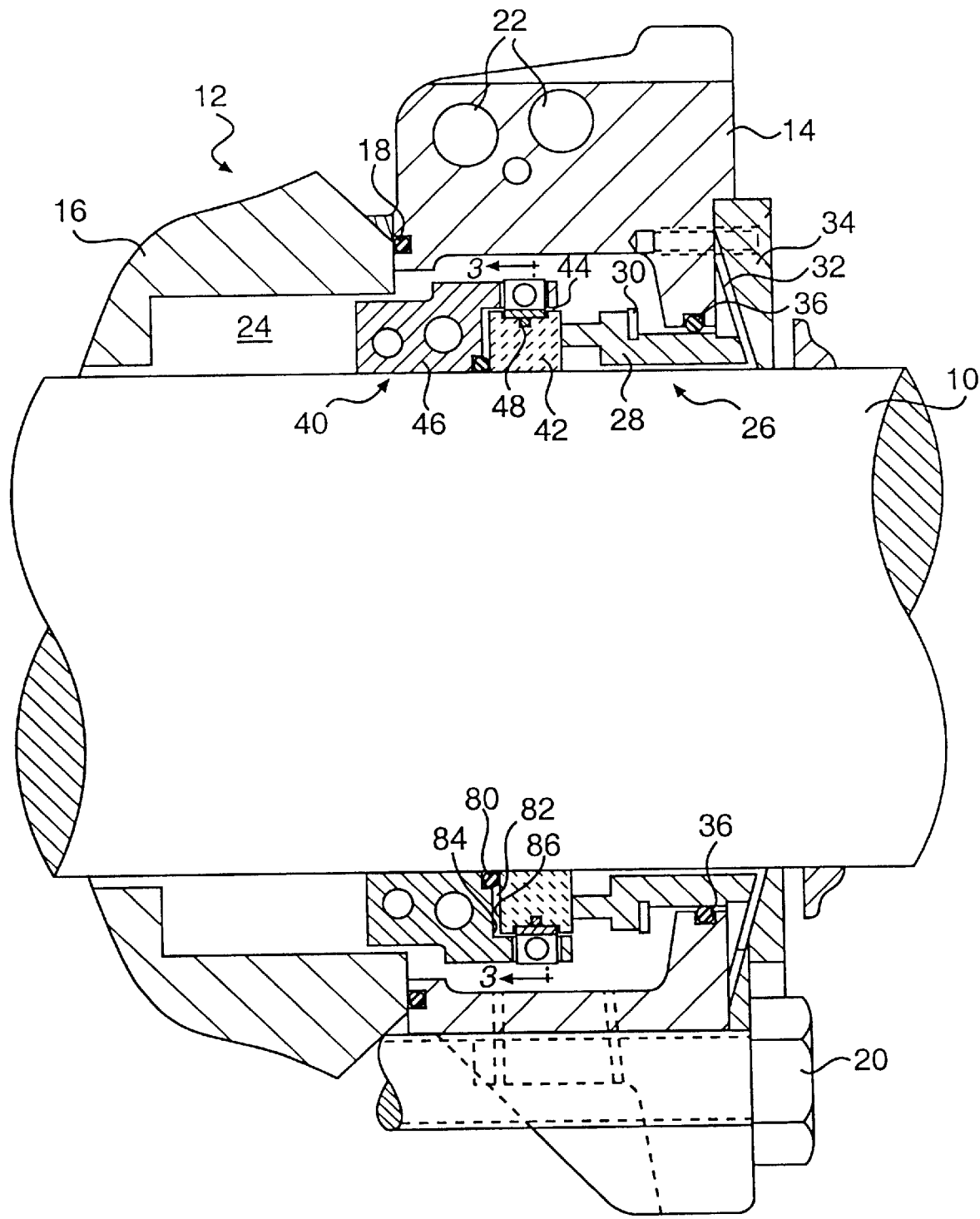
FIG. 1 is a cross-sectional view of a mechanical split seal showing assembled parts of a rotating seal ring component kit incorporating the teachings of the subject invention.

Simply stated, the subject invention is directed toward parts of a rotating seal ring component for a mechanical split seal which make up a kit in disassembled form and which make up an actual rotating seal ring component in assembled form, which rotating seal ring component may be utilized in a conventional mechanical split seal. For example, there is included in FIG. 1 a cross-sectional view of parts of a prior art mechanical split seal of the type illustrated in the Sandgren patent referenced above which may be used with the rotating seal ring components incorporating the teachings of the subject invention as are also shown in FIG. 1. Thus, it should be understood that the subject invention is directed only toward the parts of the rotating seal component kit and is not directed toward the additional portions of a conventional or prior art mechanical split seal. Those additional portions illustrated in FIG. 1 are, therefore, by way of example and not limitation.

The mechanical split seal illustrated in FIG. 1 is assembled about a shaft 10. The mechanical split seal of FIG. 1 comprises stationary housing 12 which includes gland 14, cap 16, gland packing 18, and gland screws 22. Cap 16 represents a stationary portion of a pump housing or the like through which shaft 10 extends to form recess 24. It is the function of the mechanical split seal of FIG. 1 to seal off recess 24 located between shaft 10 and cap 16. Accordingly, gland 14 is retained to cap 16 in a sealed relationship through operation of cap screws 20. Gland packing 18 is interposed between cap 16 and gland 14 to provide a sealed relationship. Gland 14 may be split into 180 degree portions and fastened to each other through operation of gland screws 22 or in the alternative gland 14 may be constructed in a single unitary form.

The mechanical split seal of FIG. 1 includes a rotating seal ring component described below and a non-rotating seal ring component 26. Non-rotating seal ring component 26 is illustrated in FIG. 1 as including a split non-rotating seal ring 28, retaining or snap ring 30, finger spring 32, finger spring retainer 34, and o-ring 36.

As should be appreciated by those skilled in the art, split non-rotating seal ring 28 may comprise a brittle material such as carbon that can be cracked into two or more sections through the imposition of properly applied tension forces. Depending upon the materials used, the walls at splits forming the sections can be relatively smooth or rough. Nevertheless, by reassembling the split sections into a whole non-rotating seal ring, a sealing surface may be defined. In the embodiment of FIG. 1, split non-rotating seal ring 28 is held together through the utilization of snap ring 30. Ring 30 is positioned in an outer circumferentially positioned recess of split non-rotating seal ring 28. Thus, a person assembling non-rotating seal ring component 26 would first position the sections of split non-rotating seal ring 28 around shaft 10 in an aligned orientation, and push the retaining or snap ring 30 into the outer circumferential recess in seal ring 28 to hold those seal ring sections together. Once ring 30 is in place, it is typically difficult if not impossible to realign the sections of seal ring 28 with respect to one another, particularly when a brittle material is used to form seal ring 28 so as to result in substantial roughness on the exposed walls of the splits in seal ring 28. Accordingly, manual alignment of the sections of seal ring 28 is required prior to positioning of ring 30 around seal ring 28.

After positioning of ring 30, and provided the rotating seal ring component has already been positioned, gland 14 may be assembled over the outer circumference of seal ring 28. In an embodiment in which gland 14 comprises two separated halves, those halves are reassembled using gland screws 22. In the case of a unitary gland 14, gland 14 is slid over the outer circumferential surface of seal ring 28.

As is shown in FIG. 1, o-ring 36 is interposed between gland 14 and seal ring halves 28. Preferably, o-ring 36 is split into two sections but nevertheless provides sealing between shaft 10 and seal ring 28 and o-ring 36 also preferably provides resilient support for seal ring 28 which prevents a bottoming out or touching of seal ring 28 and gland 14. This may be accomplished, as should be understood by those skilled in the art, through the choice of relative dimensions for o-ring 36, the slot or recess in gland 14 holding o-ring 36, the inside circumferential opening defined by gland 14 and the outer circumferential surface defined by that portion of seal ring 28 adjacent o-ring 36.

Preferably a meaningful gap is maintained between gland 14 and seal ring 28 during operating conditions.

Conventionally, seal ring 28 is urged axially along shaft 10 toward a rotating seal ring which will be described below. This urging is accomplished in the embodiment of FIG. 1 through operation of finger spring 32. Finger spring 32 preferably comprises a split annular finger spring in the form of a diaphragm spring having radially inwardly extending segments or fingers that may be of equal dimensions and that are separated by radial grooves. The split in finger spring 32 preferably is oriented so as to position two of the fingers across the splits defining the sections of seal ring 28. In addition, it is preferable that the rear portion of seal ring 28 which comes in contact with finger spring 32 has at least one indent into which a finger of spring 32 may be inserted so as to prevent relative rotation of seal ring 28 with respect to finger spring 32 and, therefore, with respect to gland 14. This is a simple and preferable arrangement for maintaining seal ring 28 stationary. Finger spring retainer 34 preferably is also split and is dimensioned to protect finger spring 32 while at the same time permitting a certain degree of flex in the fingers of finger spring 32. However, it should be understood that the invention which is the subject of this application may be practiced with a non-rotating seal ring component not employing the specific features of the non-rotating seal ring component 26 illustrated in FIG. 1.

In accordance with the teachings of the present invention there is provided a rotating seal ring component kit comprising a number of parts including at least a seal ring having a split dividing the seal ring into at least two sections configured to fit around the shaft, a clamp ring having a split dividing the clamp ring into at least two sections configured to circumferentially surround the seal ring halves, and a housing having a split dividing the housing into at least two sections configured to fit around the shaft, with the clamp ring and the housing including respective tabs and notches oriented to prevent rotation of the clamp ring relative to the housing.

A preferred embodiment of the present invention shown in FIG. 1 includes, by way of example and not limitation, a rotating seal ring component 40. Rotating seal ring component 40 is shown to comprise a seal ring 42, a clamp ring 44, a housing 46, and a retainer or snap ring 48. As noted in the background, the term "halves" or "sections" as applied to the seal ring, the clamp ring, and the housing is not meant to be limited to two identical pieces but rather is meant to convey that each of these items is divided or split into two or more pieces circumferentially. Thus, the terms "halves" or "sections" as used throughout this application should be broadly interpreted to encompass a configuration in which the seal ring, clamp ring and/or housing was circumferentially divided into any number of circumferential pieces either of the same or different circumferential dimension.

Figure 2:
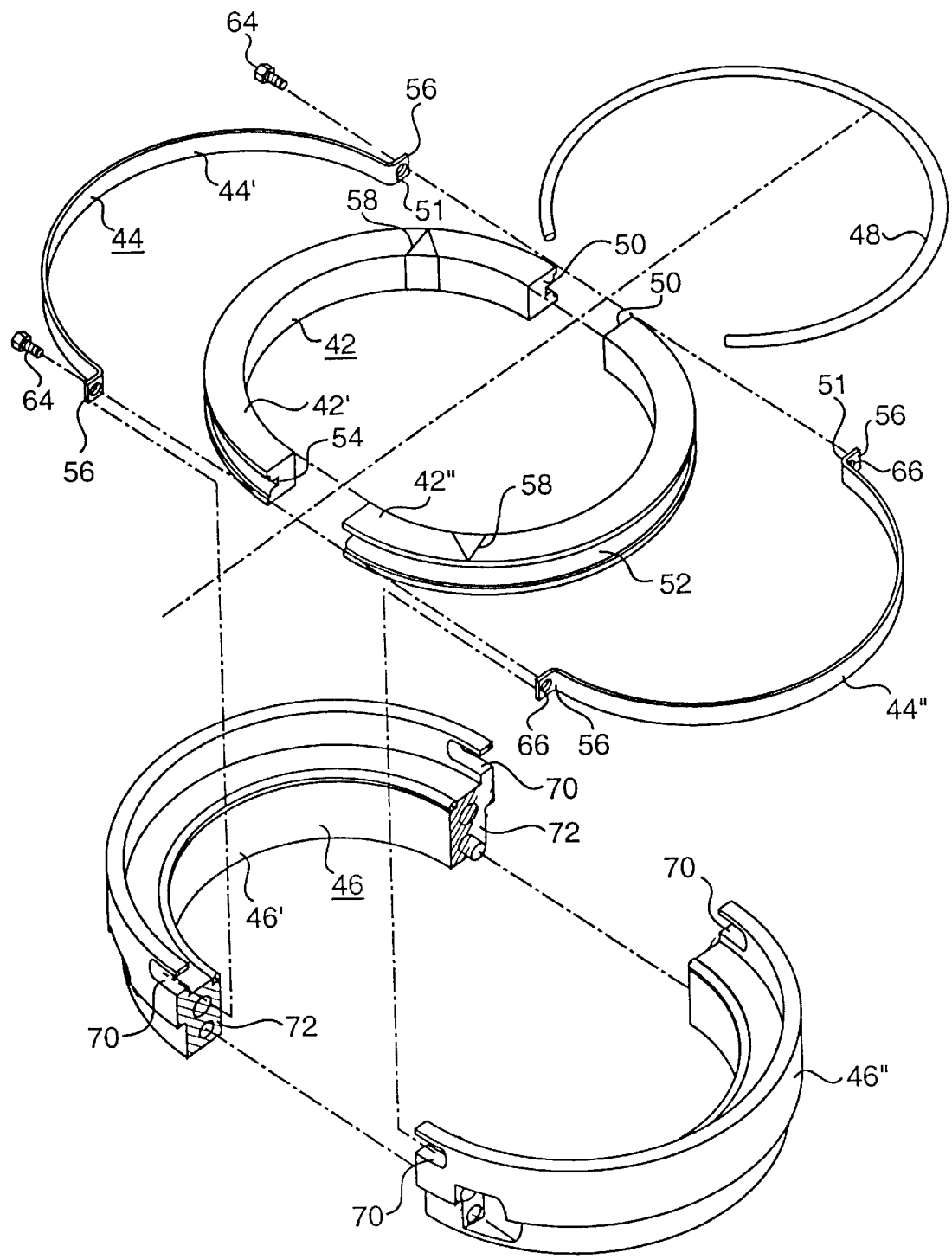
FIG. 2 is an exploded isometric view of the parts of a rotating seal ring component kit illustrated in FIG. 1.
Figure 3:
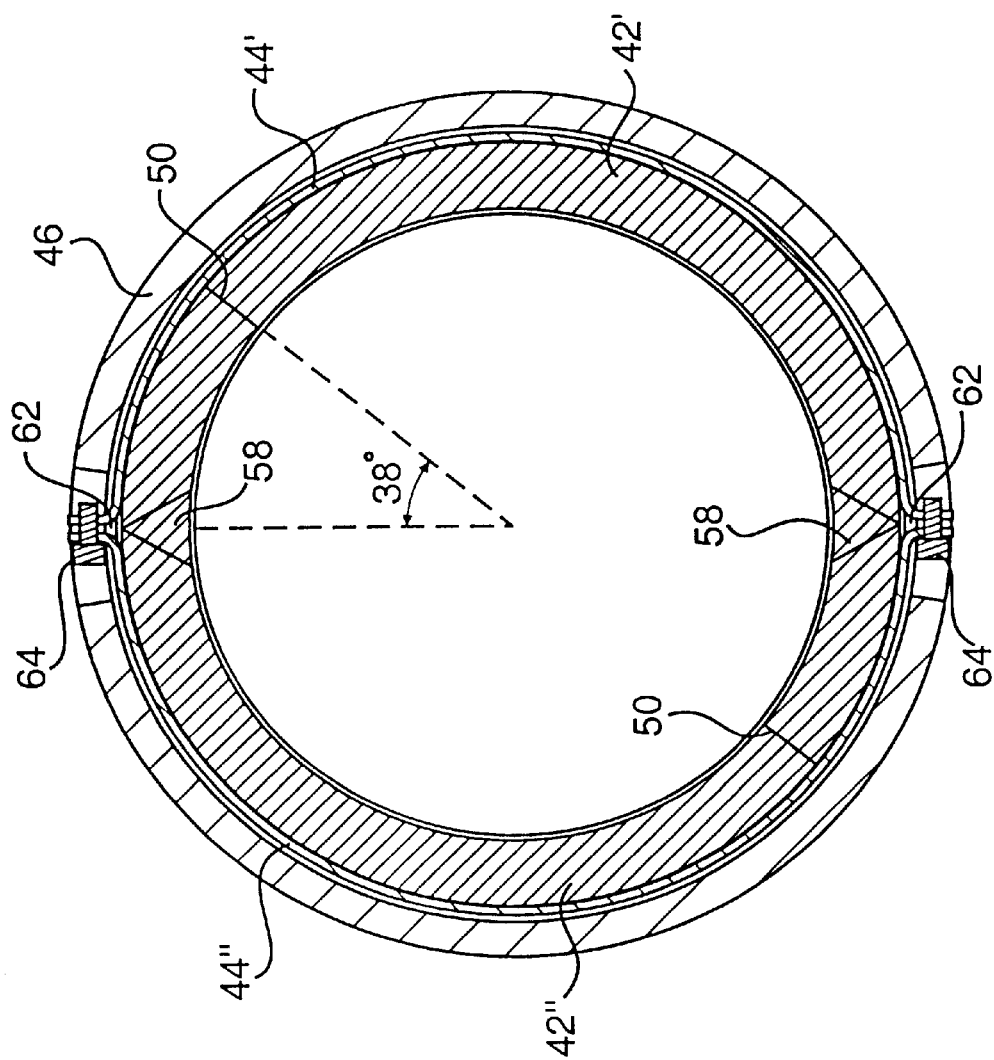
FIG. 3 is a sectional view of the rotating seal ring component of FIG. 1 taken along the line 3—3 in FIG. 1.

As might be better seen in FIG. 2, seal ring 42 has a split 50 dividing seal ring 42 into at least two sections 42', 42" For example, split ring 42 may comprise a generally conventional split seal ring made up of conventional seal ring materials such as carbon which has been split, cracked or otherwise separated into two separate halves. Preferably, as to split ring 42, each split leaves a jagged or rough edge of sufficient contour so as to retard and/or prevent any relative movement of the ends once manually aligned and split ring 42 is reassembled into a rigid non-split ring by operation of clamp ring 44.

Features which may be said to distinguish seal ring 42 from a conventional seal ring include the imposition of an outer circumferential groove 52 and an outer circumferential recess 54. As will be explained in more detail below, outer circumferential groove 52 preferably has an axial width greater than the axial width of clamp ring 44 to thereby permit a general orientation or positioning of clamp ring 44 about the outer circumference of seal ring 42. In addition, as will be discussed in more detail below, recess 54 is preferably included within groove 52 and has sufficient dimension to receive snap ring 48 while nevertheless permitting assembly of clamp ring 44 over snap ring 48.

When assembled, as should be appreciated by those skilled in the art, seal ring 42 presents a rotating sealing surface to non-rotating seal ring 28 so as to form an effective fluid seal of recess 24 within stationary housing 12.

Clamp ring 44 has a split 51 dividing clamp ring 44 into at least two sections 44', 44." The term "split" is meant to reference a division into two parts, which may be accomplished either by splitting a solid part or by fabricating two separate parts. It is preferable that clamp ring 44 be formed from two separately fabricated parts and that clamp ring 44 forms an essentially closed ring which extends less than 360 degrees when placed around clamp seal ring 42, thus resulting in a gap 62 (see FIG. 4) between the ends when clamped together. This gap allows clamp ring 44, when circumferentially positioned around seal ring 42, to clamp seal ring 42 into a rigid non-split ring configuration. Clamp ring 44 may, for example, be formed from a bent strip of stainless steel, but also might be constructed through machining of a solid ring of metal. The ends of clamp ring 44 extend radially outward to form tabs 56 as best seen in FIG. 2. As will be discussed in more detail below, tabs 56 are configured to engage notches in housing 46 to fixedly position clamp ring 44 with respect to housing 46. Housing 46 has a split 72 dividing housing 46 into at least two sections 46', 46". Housing 46 is preferably fabricated by actually cutting or separating a solid part into sections 46', 46", thereby creating split 72.

As noted above, in a preferred embodiment, seal ring 42 has been split so as to provide rough fission walls on the outer surfaces of the split 50. Thus, when the two (or more) seal ring sections 42', 42" are fitted together over the shaft, the rough fissure walls at the resultant splits may be utilized to accurately, manually align the two sections together. After this alignment has been manually accomplished, snap ring 48 is inserted in place to hold seal ring sections 42', 42" in alignment. Preferably the opening of snap ring 48 should be positioned at the split of one of seal ring sections 42', 42", as shown in FIG. 2. This operation may be accomplished by a single operator without the need for involvement of multiple individuals. The operator undertaking this assembly must assure through sight and/or feel that seal ring sections 42', 42" are properly aligned since there preferably can be and will be no relative movement of seal ring sections 42', 42" once there has been complete assembly of the rotating seal ring component parts. It should be understood that while recess 54 is helpful in providing a rough alignment of seal ring sections 42', 42", there is no need for a high degree of accuracy in the positioning of recess 54 into which snap ring 48 is inserted provided there is reliance on manual alignment of seal ring sections 42', 42", through physical touch and/or sight. Thus, the width of recess 54 into which snap ring 48 is inserted may be slightly larger than the width of snap ring 48.

After positioning of snap ring 48, clamp ring 44 is next assembled around the outer circumference of seal ring 42.

As will be discussed in more detail below, split 50 in seal ring 42 is preferably mis-aligned with split 51 in clamp ring 44 by approximately 30 to 50 degrees. To accomplish this mis-alignment, a mis-alignment mark 58 may be imprinted, engraved or otherwise affixed to seal ring 42 at a radial position 30 to 50 degrees from split 50 in seal ring 42. More preferably, this radial position is in the range of 37 to 39 degrees from split 50 in seal ring 42. Thus, the operator who is assembling the rotating seal ring component kit simply aligns mis-alignment mark 58 with split 51 between tabs 56 of clamp ring 44 to assure the requisite radial mis-alignment between seal ring 42 and clamp ring 44.

Prior to closure, clamp ring 44 fits loosely in the outer circumferential groove 52 of seal ring 42 so that alignment between two seal ring sections 42 is completely dependent upon the rough fissure walls which had been utilized to assure manual alignment prior to insertion of snap ring 48. The purpose of clamp ring 44 is to rigidly and securely hold seal ring 42 together into a rigid non-split configuration without relative axial movement between seal ring sections 42', 42".

Figure 5:
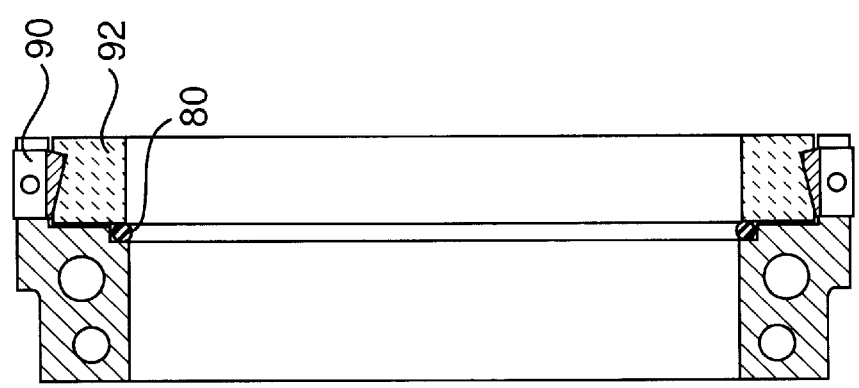
FIG. 5 is a cross-sectional view of an alternative embodiment of an assembled rotating seal ring component kit incorporating the teachings of the present invention.

The above-described configuration is best utilized when the split walls of seal ring 42 are rough. In the case where the seal ring material used results in smooth breakage at the splits, there may be a need to provide additional external alignment of the seal ring sections. An alternative embodiment to accomplish this result is shown in FIG. 5. In FIG. 5, clamp ring 90 is made from machining a ring with two cone angles that mate accurately with corresponding machine grooves in the outside diameter of seal ring 92. Tightening of clamp ring 90 forces the sections of seal ring 92 into alignment. The configuration of FIG. 5 may be utilized with or without an auxiliary snap ring as illustrated by snap ring 48 of FIG. 2. Obviously, alignment in the embodiment of FIG. 5 is critically dependent upon the accuracy of the machined grooves in seal ring 92. Therefore, the preferable method is to use a seal ring material which results in a sufficiently rough split to accomplish manual alignment without the need for any external alignment mechanism of the type shown in FIG. 5.

Figure 4:
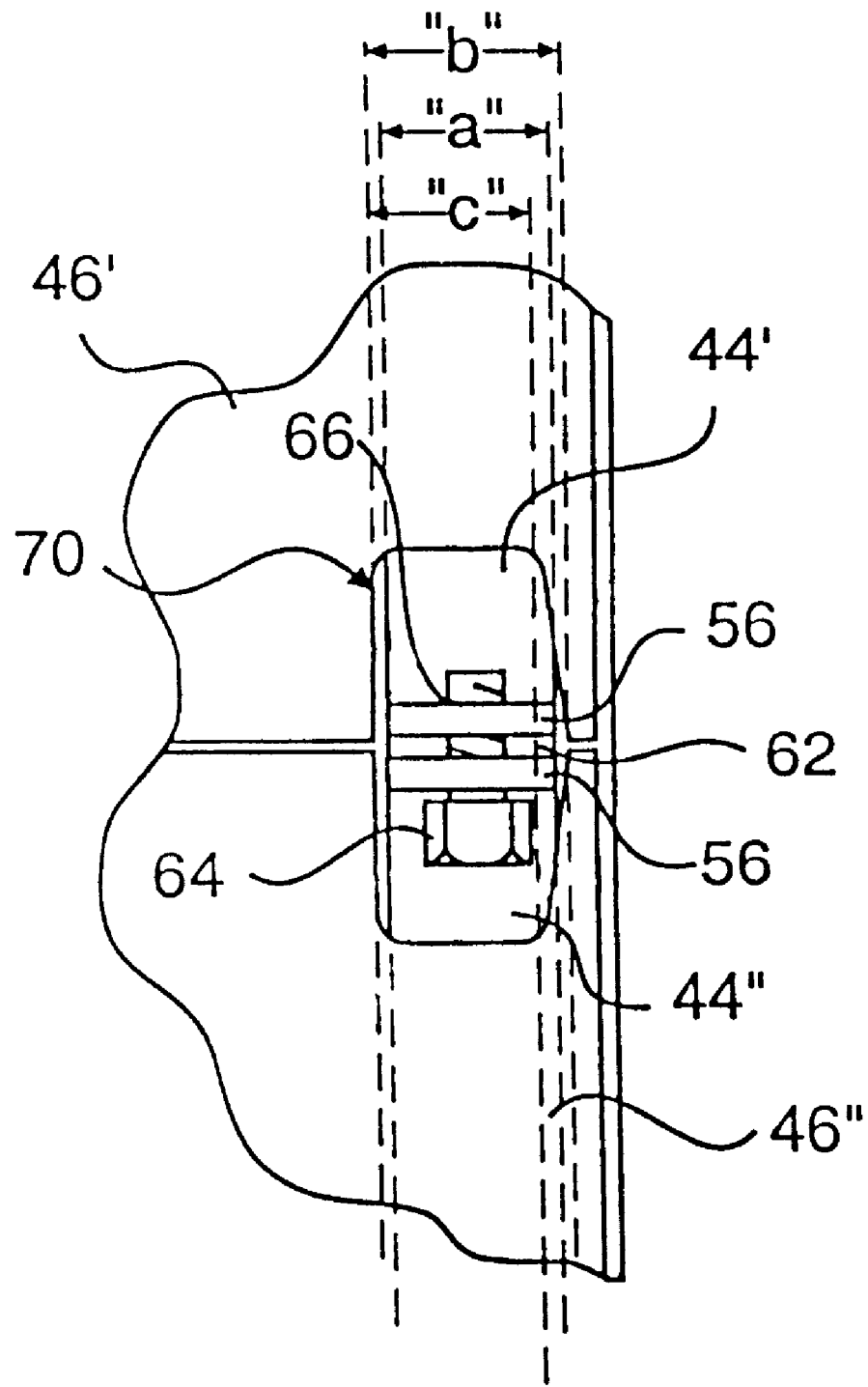
FIG. 4 is an enlarged fragmentary view of the tabs and notches of the rotating seal ring component of FIG. 1.
Figure 9:
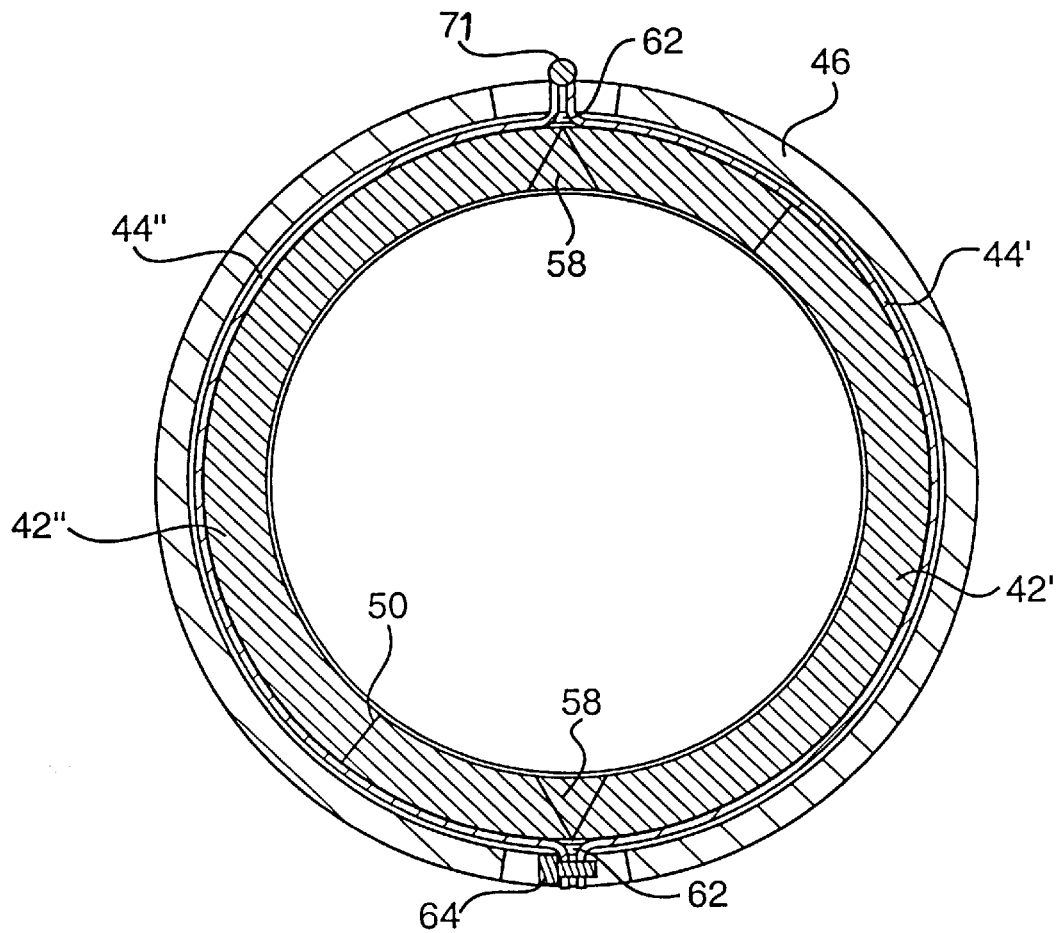
FIG. 9 is a sectional view of yet another embodiment of assembled parts of a rotating seal ring component kit incorporating the teachings of the present invention.

As may be best seen in FIG. 4, clamp ring 44 is configured so as to maintain a gap 62 between protruding parts or tabs 56 after assembly around seal ring 42. This gap 62 is intentional so as to allow tight, rigid connection between clamp ring 44 and seal ring 42. Screws 64 may be utilized in conjunction with corresponding threads 66 to assure that clamp ring 44 is tightly secured around seal ring 42. Preferably, screws 64 are captive so as to facilitate assembly. In the alternative, one of screws 64 may be replaced with a hinge 71 as illustrated, for example, in FIG. 9. Of course, it should be understood that other fastening devices such as bolts, clamps, clips, latching levers or the like may be used in place of screws 64, provided that a sufficiently tight fit is accomplished between clamp ring 44 and seal ring 42 so as to preclude any possibility of axial mis-alignment of seal ring sections 42', 42" once manual alignment has been achieved.

To assure a solid, metal-to-metal mounting relationship between clamp ring 44 and housing 46, housing 46 is provided with a plurality of machined openings or notches 70 in that portion of housing 46 which would otherwise cover the outer circumferential surface of clamp ring 44. Specifically, as shown in FIGS. 2 and 4, notches 70 are configured at split 72 of housing 46 to have a varying width in the axial direction. For example, the axial dimension or width of the tabs 56 is preferably less than one axial or width dimension of notches 70 and greater than a second axial or width dimension of notches 70. As illustratively shown in FIG. 4, the axial dimension or width of tabs 56 is shown as dimension "a"; the axial dimension or width of notches 70 at split 72 between clamp ring sections 44', 44" is "b", where "b" is greater than "a"; and the width or axial dimension or notches 70 at the ends of notches 70 is "c", where "c" is less than "a". Accordingly, during assembly, tabs 56 can be inserted into notches 70 provided they are positioned to align generally with split 72 between housing sections 46', 46." However, as any meaningful rotation occurs between clamp ring 44 and housing 46, tabs 56 will quickly encounter the sidewalls of notches 70, since dimension "a" of tabs 56 is less than dimension "c" of notches 70. As tabs 56 engage the interior walls of notches 70 there is a rigid, metal-to-metal interconnection developed under the force of attempted continued relative rotation which essentially locks clamp ring 44 rigidly into notches 70 of housing 46. Preferably, notches 70 are machined into housing 46 with a converging angle so that, as noted above, upon relative rotation between clamp ring 44 and housing 46, tabs 56 wedge the two units together providing both non-resilient axial support and torque drive.

As should be appreciated by those skilled in the art, the internal circumferential dimension of housing 46 is selected so as to be slightly greater than the external circumferential dimension of shaft 10 so as to afford a tight and secure fit of housing 46 on shaft 10. Sealing may be accomplished in a conventional manner between housing 46 and shaft 10 through the utilization of sealing o-ring 80, which may also be split into sections. It should be understood that o-ring 80 operates only as a sealing member and should not and need not be configured to provide any measurable support to seal ring 42. As shown in FIG. 1, it is intended that there be a separation or gap 82 between interior wall 84 of the housing 46 and the non-sealing face interior wall 86 of seal ring 42. Gap 82 eliminates the need for any lapping of either the interior wall 84 of housing 46 or the interior wall 86 of sealing ring 42; essentially the entire support of sealing ring 42 being affected through the rigid interconnection of clamp ring 44 with housing 46.

Figure 7:
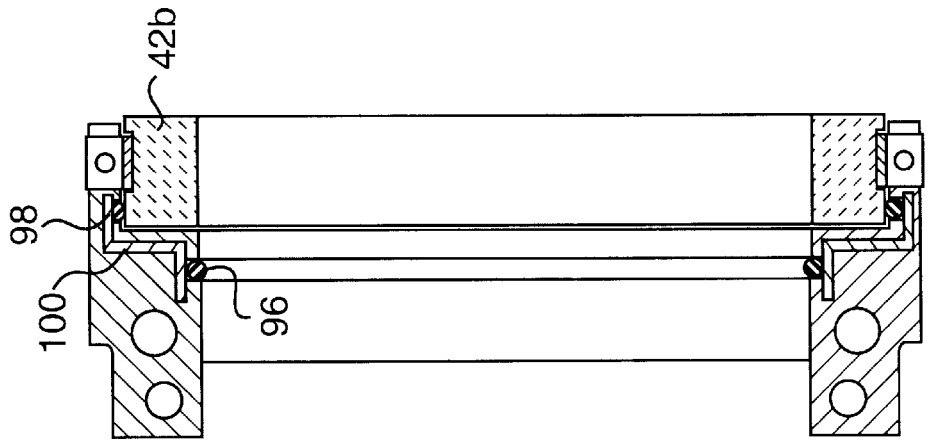
FIGS. 6 and 7 are cross-sectional views of yet additional alternative embodiments of an assembled rotating seal ring component kit incorporating the teachings of the subject invention.
Figure 6:
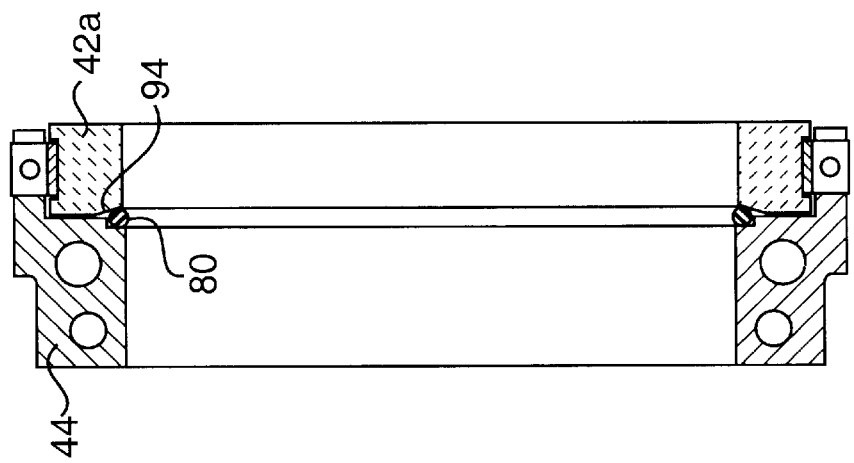

In the configuration shown in FIG. 1, sealing o-ring 80 operates to seal shaft 10 to seal ring 42 and to housing 46. In an alternative embodiment shown in FIG. 6, the back of seal ring 42a is machined with a conical wall so that o-ring 80 can operate during assembly to help center sealing ring 42a on shaft 10. In a further alternative, sealing o-ring 80 may be replaced with sealing o-ring 96 and sealing o-ring 98 as shown in FIG. 7. Sealing o-ring 96 provides a seal between shaft 10 and housing 46 whereas, sealing o-ring 98 provides a seal between the outer circumferential surface of seal ring 42b and housing 46. Seal o-ring 96 also acts to help center sealing ring 42b on shaft 10. A gasket 100 is positioned to effect a seal between o-rings 96 and 98. Gasket 100 is required if the split 72 between housing sections 46', 46" is not completely closed upon assembly and friction is used to hold housing 46 on shaft 10. If the surfaces of housing sections 46', 46" are machined smooth and permitted to close upon assembly, gasket 100 is not required, but a set screw or the like (not shown) is then needed to fix housing 46 to shaft 10. In either event, the embodiment of FIG. 6 is preferred to that of FIG. 7 since a single o-ring is providing the sealing function of two o-rings and the embodiment of FIG. 7 results in a mechanical split seal with more axial length.

Figure 8:
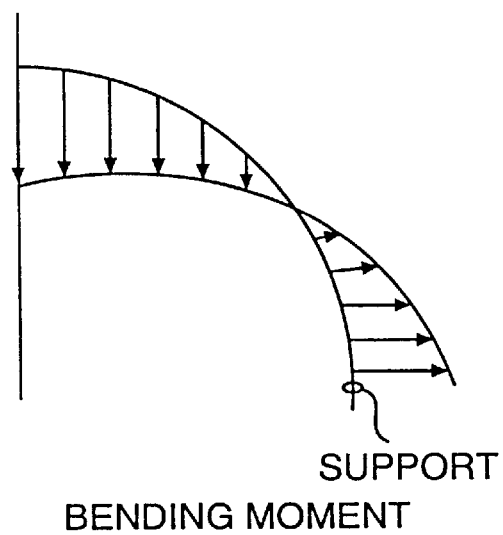
FIG. 8 illustrates the bending moment in a pair of rigidly assembled seal ring sections subjected to two axial forces 180 degrees apart and to balancing system forces extending along the periphery of the assembled seal ring sections.

As mentioned earlier, there preferably is a 30 to 50 degree mis-alignment between the split in seal ring 42 and split 50 in clamp ring 44. This mis-alignment is preferable because, as mentioned before, the interaction between tabs 56 of clamp ring 44 and notches 70 of housing 46 provides fixed, axial connection between seal ring 42 and housing 46 in two locations, 180 degrees apart; namely, the two locations where tabs 56 interact with notches 70. The resultant axial forces on these two locations balance all other system forces on seal ring 42. Since these system forces are dispersed over the whole circumference of seal ring 42, they give rise to a bending moment in seal ring 42. This bending moment, as shown in FIG. 8 has a positive maximum at the tabs 56 of clamp ring 44 and a negative for maximum bending moment 90 degrees therefrom. In between, the bending moment passes through zero at approximately 37 to 39 degrees, somewhat dependent upon the actual dimensions utilized. By locating the fissure split 50 of seal ring 42 close to this location, the performance of the disclosed designed is enhanced. For example, in testing a 5.25 inch diameter shaft seal, moving fissure split 50 from 90 degrees from the clamping ring split 44, to the a location of approximately 38 degrees, improved the sealing of the design from leaking at 30 psig to leaking at 230 psig. To assure the desired preset mis-alignment for any particular configuration, it is preferable that mark 58 be affixed to sealing ring 42 as mentioned before.

Additional advantages and modifications will readily occur to those skilled in the art. The invention in its broader aspects is not, therefore, limited to the specific details representative methods and illustrative examples shown and described. Accordingly, departures may be made from such details without departing from the spirit or scope of applicants' general inventive concept.

We claim:

1. A rotating seal ring component kit comprising:
   a seal ring having a split dividing said seal ring into at least two sections configured to fit around a shaft;
   a clamp ring having a split dividing said clamp ring into at least two sections configured to circumferentially surround said seal ring, each clamp ring section having tabs which cooperate with corresponding tabs on another clamp ring section to permit assembly of said clamp ring sections around said seal ring sections; and
   a housing having a split dividing said housing into at least two sections configured to fit around the shaft, said housing including at least one notch for each set of corresponding tabs, each notch configured to receive said tabs so as to prevent rotation of said clamp ring and said seal ring relative to said housing.

2. A rotating seal ring component kit of claim 1, wherein said notches have an interior configuration and said tabs have an exterior configuration to fixedly hold said clamp ring in said housing upon initial rotation of said clamp ring.

3. A rotating seal ring component kit of claim 1, wherein the axial dimension of said tabs is less than one axial dimension of said notches and greater than a second axial dimension of said notches.

4. A rotating seal ring component kit of claim 1, wherein said seal ring includes an outer circumferential groove having an axial width greater than the axial width of said clamp ring.

5. A rotating seal ring component kit of claim 4, further comprising a snap ring and said seal ring includes in said groove an outer circumferential recess of sufficient dimension to receive said snap ring and permit assembly of said clamp ring over said snap ring.

6. A rotating seal ring component kit of claim 1, wherein said tabs of said clamp ring include either captured screws or corresponding threaded holes to receive said screws.

7. A rotating seal ring component kit of claim 1, wherein said housing includes a surface configured to surround said clamp ring.

8. A rotating seal ring component kit of claim 1, wherein said tabs extend radially outward.

9. A rotating seal ring component kit of claim 1, wherein said seal ring includes at least one mark positioned to permit a preset radial mis-alignment between said seal ring and said clamp ring.

10. A rotating seal ring component kit of claim 9, wherein said preset radial mis-alignment positions said seal ring sections in the range of 30 degrees to 50 degrees from said tabs.

11. A rotating seal ring component kit of claim 10, wherein said preset radial mis-alignment positions said split of said seal ring sections approximately 38 degrees from said tabs.

12. A rotating seal ring component kit of claim 1, further comprising a snap ring and said seal ring includes an outer circumferential recess of sufficient dimension to receive said snap ring.

13. A rotating seal ring component kit of claim 12, wherein said recess is of sufficient depth to permit assembly of said clamp ring halves over said snap ring.

14. A rotating seal ring component kit of any one of claims 1–13, wherein said kit is assembled to form a rotating seal ring component.

15. A method of mounting a rotating seal ring component on a shaft comprising the steps of
   a. positioning sections of a split seal ring around the shaft;
   b. assembling sections of a clamp ring around said seal ring to circumferentially surround said seal ring, each clamp ring section having tabs which cooperate with corresponding tabs on another clamp ring section to permit assembly of said clamp ring sections around said seal ring; and
   c. assembling sections of a split housing around said shaft, said housing sections including first and second notches, said step of assembling said pair of housing sections including positioning said tabs into said notches to restrict relative rotation between said housing and said clamp ring.

16. A method of claim 15, including the step of positioning a snap ring in an outer circumferential recess of said seal ring prior to said step of assembling said clamp ring around said seal ring.

17. A method of claim 16, including the step of radially mis-aligning said seal ring sections and said clamp ring sections so that the ends of said seal ring sections are in the range of 30 degrees to 50 degrees from said tabs.

18. A method of claim 17, wherein said mis-alignment is approximately 38 degrees.

19. A rotating seal ring component kit comprising:
   seal ring means for forming a split ring seal;
   first means for holding said seal ring means together;
   second means for holding said seal ring means together, said second means including at least one projecting member;
   housing means for coupling said seal ring means axially to a shaft and for preventing relative rotation between said housing means and said second means by engagement of said projecting member; and
   means for establishing a preset radial mis-alignment between said seal ring means and said second means.

20. A rotating seal ring component kit of claim 19, wherein said kit is assembled to form a rotating seal ring component.

* * * * *

UNITED STATES PATENT AND TRADEMARK OFFICE
CERTIFICATE OF CORRECTION

PATENT NO. : 5,913,521
DATED : June 22, 1999
INVENTOR(S) : Jan E. Sandgren, James S. Porter It is certified that error appears in the above-identified patent and that said Letters Patent is hereby corrected as shown below:

Title Cover Page: Item No. [75], delete "Sangren" and substitute therefor --Sandgren--;

Item No. [56], under "OTHER PUBLICATIONS", line 1, change "Bugmann" to --Burgmann--.

Signed and Sealed this

Eighth Day of February, 2000

Attest:

Attesting Officer

Q. TODD DICKINSON

Commissioner of Patents and Trademarks